E. E. LEACH.
STALK CUTTING MACHINE.
No. 178,860. Patented June 20, 1876.
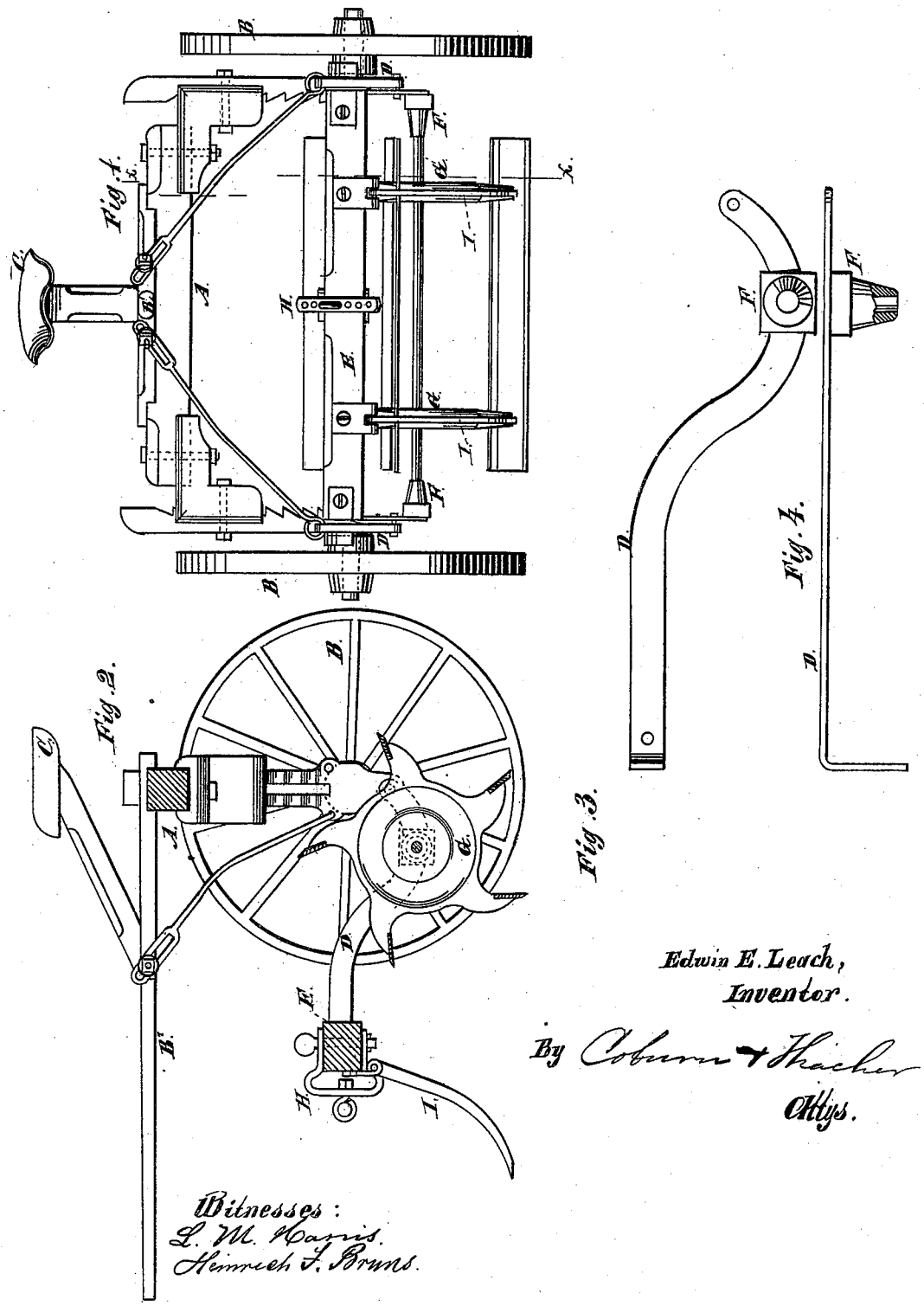
Edwin E. Leach,
Inventor.
Witnesses:

UNITED STATES PATENT OFFICE.

EDWIN E. LEACH, OF CEDAR RAPIDS, IOWA.

IMPROVEMENT IN STALK-CUTTING MACHINES.

Specification forming part of Letters Patent No. 178,860, dated June 20, 1876; application filed February 17, 1876.

*To all whom it may concern:*

Be it known that I, EDWIN E. LEACH, of Cedar Rapids, in the county of Linn and State of Iowa, have invented a new and useful Improvement in Stalk-Cutting Machine, which is fully described in the following specification, reference being had to the accompanying drawings, in which—

Figure 1 represents a front elevation of my invention; Fig. 2, a cross-section taken on the line $x\ x$, Fig. 1; and Figs. 3 and 4, a side and plan view of one of the arms in which the cutting-cylinder is suspended.

The object of my invention is to adapt a stalk-cutter for ready application to a wheeled carrying-frame, which I have shown in patents heretofore obtained, so that the same carrying-frame will answer for several attachments, and so that the action of the rotating cutter will tend to hold it down to its work.

The invention consists in hanging a cylinder armed with knives, for the purpose of cutting stalks, in a frame which is pivoted in any suitable manner to the wheeled frame, from which it extends forward of the axle of the wheels, and vibrates up and down upon its pivots.

In the drawings, A represents the frame of the machine, which is supported upon wheels B B, and carries a seat, C, for the accommodation of the driver, and a tongue, B'. The end pieces of the frame A project slightly below the axles of the wheels, as seen in Fig. 1, and to the lower ends of these pieces are pivoted two arms, D D. These arms are bent downward and then upward, as shown in Fig. 3, and extend forward in front of the wheels, their forward ends being united by a cross-bar, E. At the lowest point in the bend of the arms D bearings F are attached, which receive the journals of the cutting-cylinder G, which may be of any suitable construction, and armed with any style of cutter desired. To the front bar E the draft is attached by means of a clevis, H. This bar also is provided with two teeth, I, which act to straighten out the old stalks of corn, so that they will be in proper position to be cut up by the rotating cylinder of knives.

As the frame in which the rotating cutter is journaled is pivoted to the main frame so as to swing up and down, and the bearings of the cylinder are forward of the center about which the frame vibrates, it is evident that as the machine is drawn forward, and the cylinder is caused to rotate by the knives coming in contact with the ground, the tendency will be to force the frame downward, on account of the leverage between the bearings of the cylinder and the pivotal connection between the swinging and main frames. The force of this downward thrust of the cylinder will depend upon the distance between these two points, and should be sufficient to hold the cylinder down to its work of chopping up the stalks without any additional device.

Where the ground is soft it will be found, however, that their force must be counteracted to some extent, or the knives will be thrust into the ground too far. For this purpose the draft is attached directly to the swinging frame, and the point of attachment made adjustable vertically by means of a clevis provided with a series of holes, as seen in Fig. 1, or by any other suitable device. In this way the draft attachment may be so adjusted as to draw slightly upward upon the swinging frame, and thus counteract the downward thrust of the rotating cylinder; or, if at any time it is found necessary, it may be placed so high as to be downward in direction, and so assist in holding the frame and cylinder down to the ground.

The arms D are attached to the main frame by bolts and nuts, or any other suitable device, so that the swinging frame can be readily detached when it is desired to replace the cutter with a device which will change the purpose and operation of the machine.

Having thus described my invention, what I claim as new, and desire to secure by Letters Patent, is—

1. The combination, substantially as described, of a vibrating cutter-frame, to which the draft is attached, a revolving cutter supported thereon, and a device by means of which the draft may be adjusted vertically, for the purpose set forth.

2. A vibrating frame, carrying the cutter and the other devices pertaining to a stalk-cutting machine, and hinged to the wheel-frame by detachable joints, whereby the entire stalk-cutting apparatus may be removed from the main frame, and the latter left free for the attachment of other mechanism.

EDWIN E. LEACH.

Witnesses:
THOMAS C. CONNOLLY,
ULYSSES G. WHITE.